No. 768,758. Patented August 30, 1904.

UNITED STATES PATENT OFFICE.

BENJAMIN S. KRUPP, OF SAGINAW, MICHIGAN.

PROCESS OF MAKING PHOTOGRAPHIC SCREENS.

SPECIFICATION forming part of Letters Patent No. 768,758, dated August 30, 1904.

Application filed October 27, 1903. Serial No. 178,793. (No specimens.)

*To all whom it may concern:*

Be it known that I, BENJAMIN S. KRUPP, a citizen of the United States of America, residing at Saginaw, in the county of Saginaw and State of Michigan, have invented certain new and useful Improvements in Processes of Making Photographic Screens, of which the following is a specification.

This invention relates to photography, and particularly to that class thereunder known as "printing-screens."

The invention consists in the treatment of ground glass to be used as screens in printing or enlarging the images or negatives in photography; and it consists in the following steps: Ground glass is coated with a mixture of wood-alcohol and ground rosin which is dried after it has been applied to the plate. This coat of wood-alcohol and ground rosin produces an opaque surface. The opaque surface is treated by heat to a degree where the dullness of the glass disappears. The glass is then given from one to three coats of varnish, according to the effect desired, rendering the glass semitransparent. The plate or glass thus treated and finished is ready for an image to be thrown therethrough onto the surface of a sensitized plate or onto a developing-paper or a printing-out paper.

If a screen of the character stated be placed in front of a sensitized plate and an image be projected therethrough and the said plate be developed, the plate will contain a negative having a stippled surface. The plate thus treated produces a picture clear in outline and having a stippled surface.

Having fully described the invention, what I claim as new, and desire to secure by Letters Patent, is—

The herein-described method of preparing a photographic screen, consisting in the treatment of a ground glass with a coating of ground rosin dissolved in wood-alcohol to produce an opaque surface, heating the surface to remove the dullness and in coating and recoating the same with varnish.

In testimony whereof I affix my signature, in the presence of two witnesses, this 21st day of October, 1903.

BENJAMIN S. KRUPP.

Witnesses:
 ROBT. H. COOK,
 JOHN A. COMBS.